Aug. 21, 1923.
G. J. RACKHAM
1,465,483
CHAIN FOR ENDLESS TRACKS FOR VEHICLES
Filed March 17, 1923
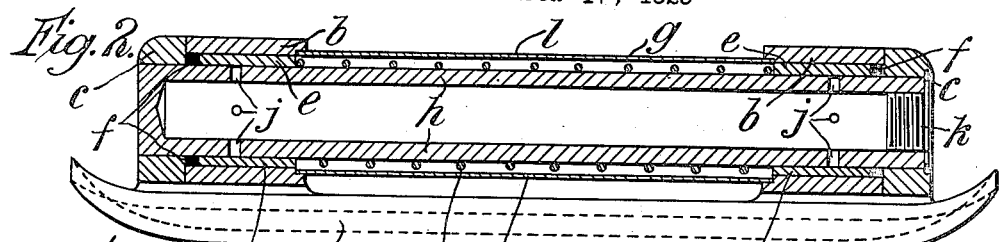
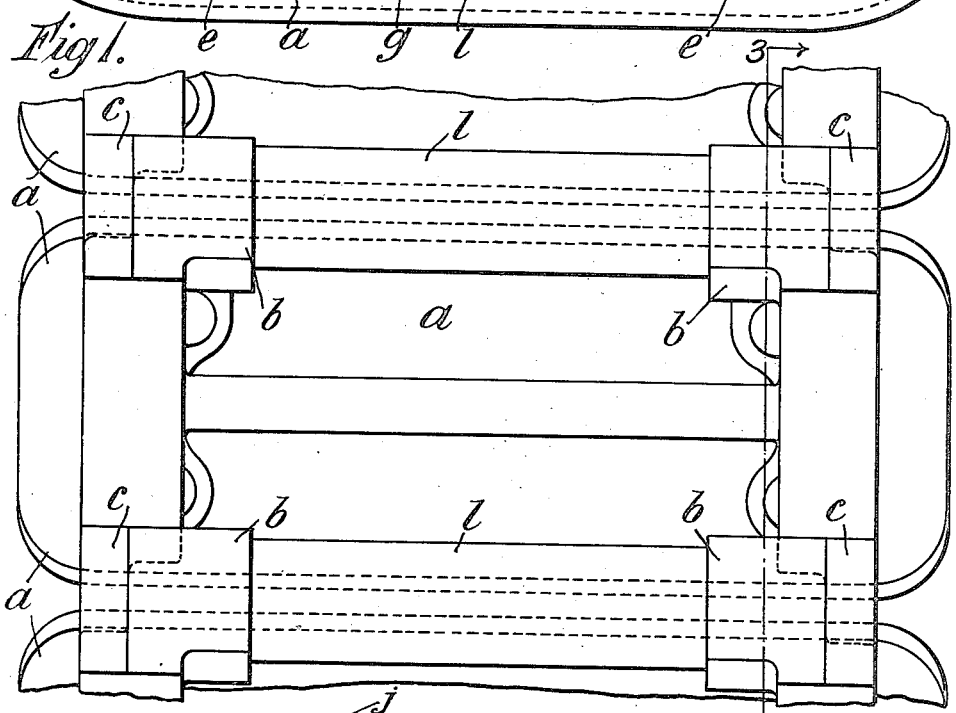
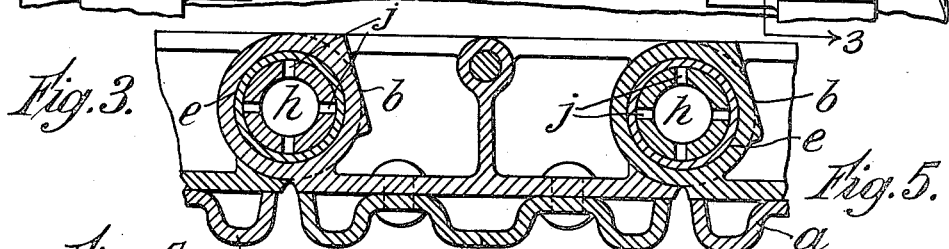
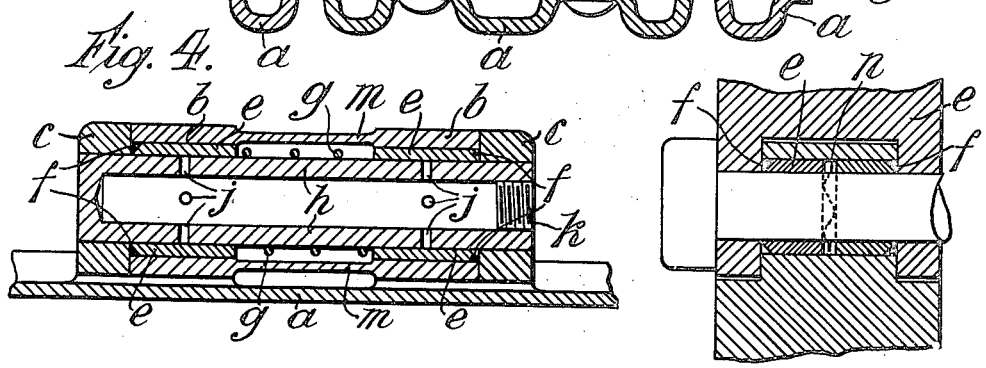
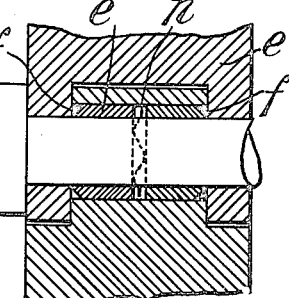
INVENTOR:
GEORGE JOHN RACKHAM,
By his Attorneys Patented Aug. 21, 1923.

1,465,483

UNITED STATES PATENT OFFICE.

GEORGE JOHN RACKHAM, OF LONDON, ENGLAND, ASSIGNOR TO ROADLESS TRACTION, LIMITED, OF LONDON, ENGLAND.

CHAIN FOR ENDLESS TRACKS FOR VEHICLES.

Application filed March 17, 1923. Serial No. 625,750.

*To all whom it may concern:*

Be it known that I, GEORGE JOHN RACKHAM, a subject of the King of Great Britain, residing at Charlton House, Old Charlton, London, England, have invented new and useful Improvements in Chains for Endless Tracks for Vehicles, of which the following is a specification.

This invention relates to chains, and particularly to chains or tracks for endless track vehicles, comprising shoes or treads pivotally connected with each other by lubricated joints. The object of this invention is to provide improved means for lubricating the pivotal connection of the shoes and for preventing the escape of lubricant or the entrance of mud or other foreign matter to the lubricant containers.

According to this invention the shoes are each provided at one end with perforated lugs and at the opposite end with perforated ears, the lugs on one shoe being adapted to lap the ears of the next adjacent shoe and the lugs and ears being connected by hollow pins adapted to contain lubricant. The pins extend through the lugs and ears, and floating bushes are interposed between the pins and the lugs and these bushes bear against washers interposed between the outer ends of the bushes and the inner sides of the ears. A spring which surrounds each pin pushes the adjacent bushes against the washers and thus the escape of lubricant and the entrance of mud or other foreign matter is prevented. The pins are hollow and are perforated to allow lubricant to pass to the bushes and each pin is surrounded by a tube or casing which forms a receptacle for lubricant escaping from the bushes.

In the accompanying drawings:—

Figure 1 is a plan view of one of the shoes showing it connected with parts of two adjacent shoes.

Figure 2 shows a section through the joint of two adjacent shoes.

Figure 3 is a cross section of two joints on the line 3—3 of Figure 1.

Figure 4 shows a modification in which the two lugs of a shoe are cast in one piece with a connecting member which provides a casing for the spring.

Figure 5 shows a construction in which a narrow shoe is provided with a joint in which the bushes are pressed apart by a wave spring.

Referring to Figures 1 to 3, inclusive, each shoe *a* is formed at one end with perforated or hollow lugs *b* and at the other end with perforated hollow ears *c*, the lugs being closer together than the ears *c* so that the lugs and ears on adjacent shoes may lap as shown. A hollow pin *h* extends through the lugs and ears and pivotally connects the shoes. Each pin is permanently closed at one end and at its opposite end is provided with a screw plug *k*. Lubricating material may be placed in the pin and retained there by the plug. The inner diameter of the lugs *b* is slightly greater than the inner diameter of the ears *c*, thus leaving a chamber to receive at each end of the joint a floating bush *e* which thus intervenes between a lug *b* and the pin *h*. Washers *f* are interposed between the outer ends of the bushes and the inner sides of the ears. A spring *g* which surrounds the pin of each joint bears against the inner ends of the bushes and forces them apart and against the washers *f* thus pressing the washers against the ears *c*.

The pins *h* are perforated, as indicated at *j*, to allow lubricant to pass from the pin chamber to the bushes. In order to retain the lubricant which escapes from the bushes I provide a casing consisting of a tube *l* which surrounds the spring *g* and presses against the inner sides of the lugs *b*.

In this way provision is made for properly lubricating the joint and the escape of lubricant and the entrance of mud or other foreign matter is prevented.

Figure 4 shows a modification in which the lugs *b* of each shoe are formed integrally with a casing *m* which takes the place of the tube *l* serving a similar purpose.

Figure 5 shows a modification in which the bushes *e* are pressed apart by a wave spring *n*.

I claim as my invention:—

1. A chain for endless track vehicles, comprising a series of links having hollow lugs and ears connected by pins extending through the lugs and ears and surrounded by floating bushes located between the pin and lugs and pressed apart by springs which force the bushes towards the inner faces of the ears.

2. A chain for endless track vehicles, comprising a series of links having hollow lugs and ears, of different internal diameters connected by pins extending through the lugs and ears and surrounded by floating bushes arranged within the lugs and pressed apart by springs which force the bushes towards the inner faces of the ears.

3. A chain for endless track vehicles, comprising a series of links having hollow lugs and ears connected by pins extending through the lugs and ears and surrounded by floating bushes located between the pin and lugs and pressed apart by springs which force the bushes towards the inner faces of the ears, and washers interposed between the outer ends of the bushes and the inner sides of the ears.

4. A chain for endless track vehicles, comprising a series of links having hollow lugs and ears connected by pins extending through the lugs and ears and surrounded by floating bushes located between the pin and lugs and pressed apart by springs which force the bushes towards the inner faces of the ears, and a casing surrounding each spring.

5. A chain for endless track vehicles, comprising a series of links having hollow lugs and ears connected by hollow pins for containing lubricating material which extend through the lugs and ears, and which are surrounded by floating bushes located between the pin and lugs and pressed apart by springs which force the bushes towards the inner faces of the ears said pins being perforated for the passage of the lubricant to the bushes.

6. A chain for endless track vehicles, comprising a series of links having hollow lugs and ears of different internal diameters connected by hollow pins for containing lubricant which extend through the lugs and which are surrounded by bushes arranged within the lugs and which are pressed apart by springs which force the bushes towards the inner faces of the ears, said hollow pins being perforated to permit lubricant to pass to the bushes.

7. A chain for endless track vehicles, comprising a series of links having hollow lapping lugs and ears of different internal diameters connected by hollow pins for containing lubricating material and which extend through the lugs and ears and which are surrounded by floating bushes arranged within the lugs and which are pressed apart by springs which force the bushes towards the inner faces of the ears.

GEORGE JOHN RACKHAM.